US008844252B2

(12) United States Patent
Pilon, Jr. et al.

(10) Patent No.: US 8,844,252 B2
(45) Date of Patent: Sep. 30, 2014

(54) BI-DIRECTIONAL DRIVE SYSTEM FOR TURF GROOMER AND TURF BRUSH APPLICATION

(71) Applicant: Textron Inc., Providence, RI (US)

(72) Inventors: Robert J. Pilon, Jr., Huntersville, NC (US); Richard M. Krzesicki, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 14/059,565

(22) Filed: Oct. 22, 2013

(65) Prior Publication Data
US 2014/0215989 A1 Aug. 7, 2014

Related U.S. Application Data

(63) Continuation-in-part of application No. 13/759,550, filed on Feb. 5, 2013.

(51) Int. Cl.
*A01D 34/42* (2006.01)
*A01D 43/00* (2006.01)

(52) U.S. Cl.
CPC ............................. *A01D 43/00* (2013.01)
USPC ......................................... 56/249.5

(58) Field of Classification Search
USPC ........ 56/249.5, 16.9, 249, 7; 474/86; 475/182
See application file for complete search history.

(56) References Cited

U.S. PATENT DOCUMENTS

| 1,886,408 | A | * | 11/1932 | Locke et al. | 56/15.3 |
|---|---|---|---|---|---|
| 2,043,148 | A | * | 6/1936 | Blondeau | 56/249 |
| 2,057,417 | A | * | 10/1936 | Clapper | 56/7 |
| 2,972,218 | A | * | 2/1961 | Benson | 56/15.3 |
| 3,306,370 | A | * | 2/1967 | Heth et al. | 172/519 |
| 3,518,819 | A | * | 7/1970 | Morris et al. | 56/344 |
| 3,758,967 | A | * | 9/1973 | Thompson | 37/242 |
| 3,816,985 | A | * | 6/1974 | Sorenson et al. | 56/7 |
| 3,849,043 | A | * | 11/1974 | Doering | 15/79.1 |
| 4,021,996 | A | * | 5/1977 | Bartlett et al. | 56/7 |
| 4,044,633 | A | * | 8/1977 | Lee | 475/182 |
| 4,138,837 | A | * | 2/1979 | Love | 56/11.2 |
| 4,512,139 | A | * | 4/1985 | Musser et al. | 56/11.2 |
| 4,878,340 | A | | 11/1989 | Roy et al. | |
| 5,197,267 | A | * | 3/1993 | Aldred et al. | 56/249 |
| 5,228,277 | A | | 7/1993 | Smith et al. | |
| 5,682,735 | A | | 11/1997 | Swenson et al. | |

(Continued)

FOREIGN PATENT DOCUMENTS

EP                121280 A2 * 10/1984 ............. A01F 15/00

*Primary Examiner* — Árpád Fábián-Kovács
(74) *Attorney, Agent, or Firm* — Polster Lieder

(57) ABSTRACT

A bi-directional drive system for turf grooming and brushing operations includes a first gear rotatably connected to a reel deck assembly. A reel shaft gear is connected to a reel shaft and rotated in a first axial rotation direction. Second and third gears are rotatably connected to the reel deck assembly. A double sided cogged belt is engaged to the reel shaft gear. An attachment member defining a turf component is rotated in the first axial rotational direction by rotation of the reel shaft gear connected to the first gear by the double sided cogged belt without rotation of the second and third gears. The turf component as a turf groomer is rotated in a second axial rotational direction opposite to the first axial rotational direction by rotation of the reel shaft gear connected to the first, second and third gears by the double sided cogged belt.

24 Claims, 15 Drawing Sheets

(56) References Cited

U.S. PATENT DOCUMENTS

| | | | |
|---|---|---|---|
| 6,029,433 A * | 2/2000 | Westbrook et al. | 56/249 |
| 6,651,412 B1 * | 11/2003 | Sierk et al. | 56/10.3 |
| 6,688,094 B2 * | 2/2004 | Berndt et al. | 56/249 |
| 6,834,485 B2 * | 12/2004 | Grandrud | 56/11.3 |
| 7,530,214 B1 * | 5/2009 | Rinholm et al. | 56/16.9 |
| 2003/0145570 A1 * | 8/2003 | Berndt et al. | 56/6 |

* cited by examiner

BI-DIRECTIONAL DRIVE SYSTEM FOR TURF GROOMER AND TURF BRUSH APPLICATION

CROSS-REFERENCE TO RELATED APPLICATIONS

This application is a continuation-in-part of U.S. patent application Ser. No. 13/759,550 filed on Feb. 5, 2013. The entire disclosure of the above application is incorporated herein by reference.

FIELD

The present disclosure relates to reel blade grass cutting machines and attachments therefore.

BACKGROUND

This section provides background information related to the present disclosure which is not necessarily prior art.

Existing groomer systems for reel-shaft-driven blade systems are intended to run vertically through turf-grass removing thatch and cut horizontal 'runners'. In general, groomer implements include multiple vertically arranged, side-by-side blades fixed on a common drum or shaft which spin in the same direction as the reel cutting blades. The groomer shaft can be linked for co-rotation with the reel cutting shaft, or separately rotated by an independent power source. In recent years, brush systems intended to fluff and stand up turf-grass in preparation for cutting have become more common. Brush systems are beneficial where drought resistant grass, such as dwarf grass is now grown in the southeast United States on golf courses. In general, brush implements spin in the opposite direction to the cutting unit rotation to better prepare the grass for cutting, therefore it is common for the brush system to have its own dedicated power unit independent of the power unit driving the cutting unit. Known brush systems cannot be directly interchanged with groomer systems.

SUMMARY

This section provides a general summary of the disclosure, and is not a comprehensive disclosure of its full scope or all of its features.

According to several aspects, a bi-directional drive system for turf grooming and turf brushing operations includes a first positive engagement member rotatably connected to a reel deck assembly. An attachment member releasably connected to the first positive engagement member is axially rotated in either a first or an opposite second axial rotation direction. A fastener releasably couples the attachment member to the first positive engagement member. Removal of the attachment member from the reel deck assembly is provided for by release of only the fastener.

According to several aspects, a bi-directional drive system for turf grooming and turf brushing operations includes a reel deck assembly having a reel blade assembly rotatably supported on a reel blade shaft axially rotated in a reel blade shaft rotation direction. A first positive engagement member is rotatably connected to the reel deck assembly. An attachment member releasably connected to the first positive engagement member is simultaneously axially rotated in an attachment member first axial rotation direction the same as the reel blade shaft rotation direction, or an attachment member second axial rotation direction opposite to the reel blade shaft rotation direction by selective engagement of a drive system connected to the reel blade shaft.

According to other aspects, a bi-directional drive system for turf grooming and brushing operations includes first and second accessory attachment assemblies connected to a reel deck assembly. A first drive housing connected to the first accessory attachment assembly has a first positive engagement drive member rotatable with respect to the first drive housing. A second drive housing connected to the second accessory attachment assembly has a second positive engagement drive member rotatable with respect to the second drive housing. An attachment member is releasably connected to each of the first and second positive engagement drive members and axially rotated in either a first or an opposite second axial rotation direction. First and second fasteners individually received through one of the first or second positive engagement drive members releasably couple the attachment member to the first and second positive engagement drive members. Attachment member removal is provided for by releasing only the first and second fasteners.

According to further aspects, a bi-directional drive system for turf grooming and turf brushing operations includes a reel blade assembly supported on a reel blade shaft rotatably connected to a reel deck assembly. Opposingly directed first and second positive engagement members are each rotatably connected to the reel deck assembly. An attachment member is releasably connected to each of the first and second positive engagement members and axially rotated in either a first or an opposite second axial rotation direction. The first axial rotation direction matches a rotation direction of the reel blade shaft and the second axial rotation direction is opposite to the rotation direction of the reel blade shaft. First and second fasteners individually received in a through aperture of one of the first or second positive engagement members and engaged with the attachment member releasably couple the attachment member to the first and second positive engagement members. Removal of the attachment member from the reel deck assembly is provided for by release of only the first and second fasteners.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
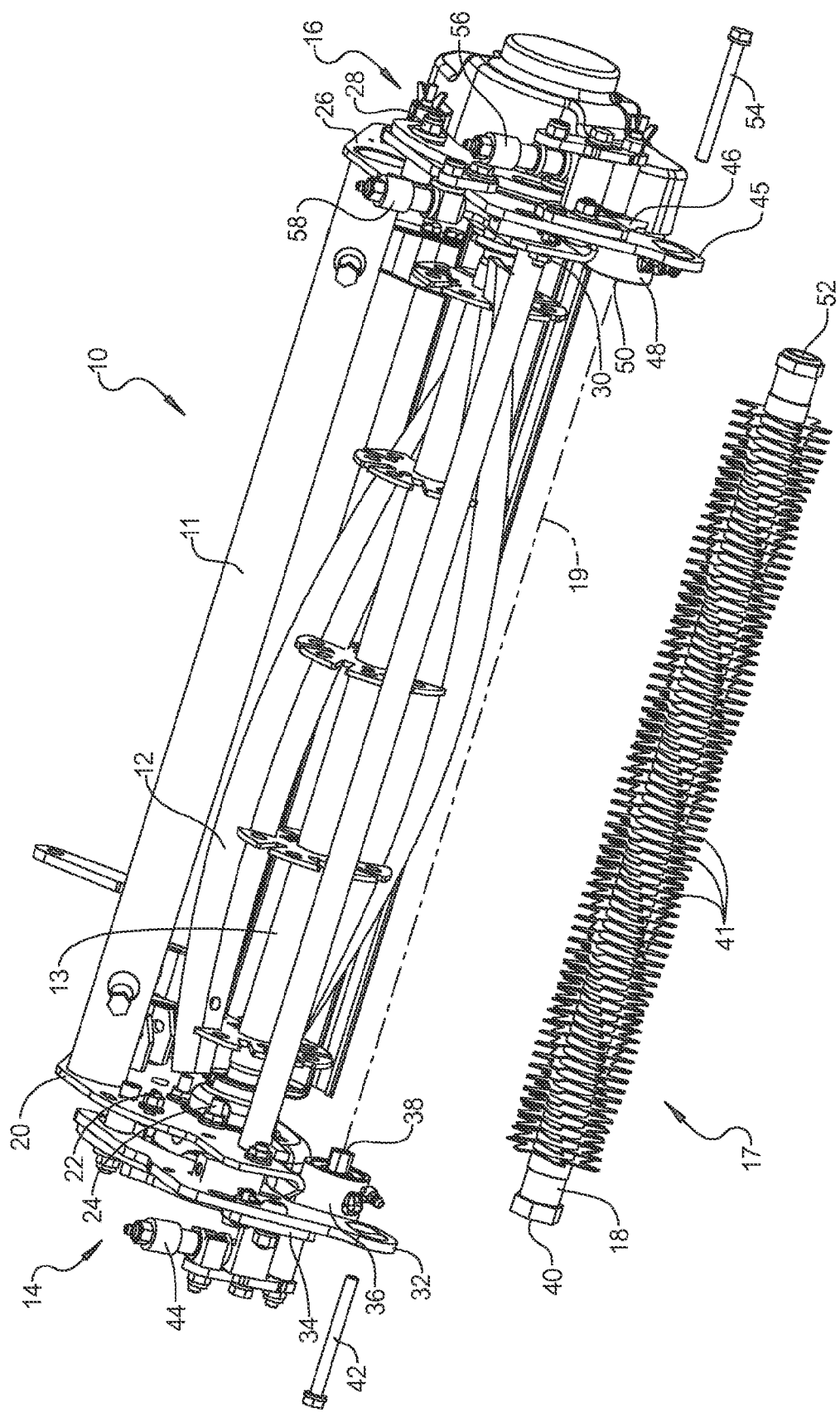
FIG. 1 is a front left perspective assembly view of a bi-directional drive system of the present disclosure.

Referring to FIG. 1, bi-directional drive system 10 for turf grooming and turf brushing operations includes a reel deck assembly 11 having a reel blade assembly 12 which is fixed for rotation with respect to an axially rotated reel blade shaft 13. First and second accessory attachment assemblies 14, 16 can be releasably mounted to the reel deck assembly 11. An attachment member 17 is simultaneously rotatably operated during operation of the reel blade assembly 12. The attachment member 17 is rotatably connected to opposed walls of the reel deck assembly 11. According to several aspects the attachment member 17 is rotatably connected to each of the first and second accessory attachment assemblies 14, 16 acting as the opposed walls to thereby provide for simultaneous rotational operation of an attachment member 17, and permit installation of the first and second accessory attachment assemblies 14, 16 and the attachment member 17 as a "kit". According to several aspects, attachment member 17 is a groomer device 18 which is axially rotated with respect to a member longitudinal and rotational axis 19. The first accessory attachment assembly 14 is mounted to a right hand (as viewed from an operator's perspective) frame 20 of reel deck assembly 11, for example using fasteners 22, 24. The second accessory attachment assembly 16 defines a drive system mounted to a left hand frame 26 of reel deck assembly 11, for example using fasteners 28, 30, where the drive system is used to transfer rotational force from the reel blade shaft 13 to attachment member 17. First and second accessory attachment assemblies 14, 16 are therefore "add-on" assemblies which are not required for turf cutting operation or for rotational connection of attachment member 17.

An extending member 32 of first accessory attachment assembly 14 provides for attachment of a component such as a grooved or smooth roller which is not further included in the discussion of the present disclosure. An assembly plate 34 of first accessory attachment assembly 14 has a first drive housing 36 mounted thereto which provides a first engagement member 38 which can be a positive engagement drive member engaging an engagement receiving member 40 of groomer device 18. Groomer device 18 can include multiple helically positioned groomer blades which are arranged in side-by-side positions on a shaft or drum, and in multiple rows, which act to run vertically through turf-grass removing thatch and cutting horizontal 'runners'. A single fastener 42 such as a threaded bolt having a bolt head and a threaded shank has the threaded shank disposed co-axially with respect to longitudinal axis 19 through drive housing 36 and engagement receiving member 40 to threadably and rotatably connect groomer device 18 to first accessory attachment assembly 14. First accessory attachment assembly 14 further includes height and position adjustment members such as height adjustment member 44 to adjust the position of longitudinal axis 19 with respect to reel blade shaft 13.

An extending member 45 of second accessory attachment assembly 16 is similar to extending member 32. Second accessory attachment assembly 16 includes multiple similar components with respect to first accessory attachment assembly 14. An assembly plate 46 of second accessory attachment assembly 16 has a second drive housing 48 mounted thereto which provides a second engagement member 50 which can be a positive engagement drive member engaging an engagement receiving member 52 of groomer device 18. A single fastener 54 such as a threaded bolt similar to fastener 42 is received co-axially with respect to longitudinal axis 19 through drive housing 48 and engagement receiving member 52 to threadably and rotatably connect groomer device 18 to second accessory attachment assembly 16. Second accessory attachment assembly 16 also includes height and position adjustment members such as a height adjustment member 56 and a position adjustment member 58 to adjust the height and position of longitudinal axis 19 with respect to a longitudinal axis 59 of reel blade shaft 13.

It is particularly noted that removal/installation of fasteners 42, 54 is all that is required as a minimum operation to either remove or install groomer device 18. Once the height and position adjustment members 44, 56, 58 are set and locked, no further adjustment of these members is required before or after installation or removal of groomer device 18. The drive housings 36, 48 do not require adjustment or repositioning to remove and/or install groomer device 18. This allows groomer device 18 to be installed or removed in approximately 2 to 10 minutes, and without removal or adjustment of the remaining components of either first or second accessory attachment assembly 14 or 16.

Figure 10:
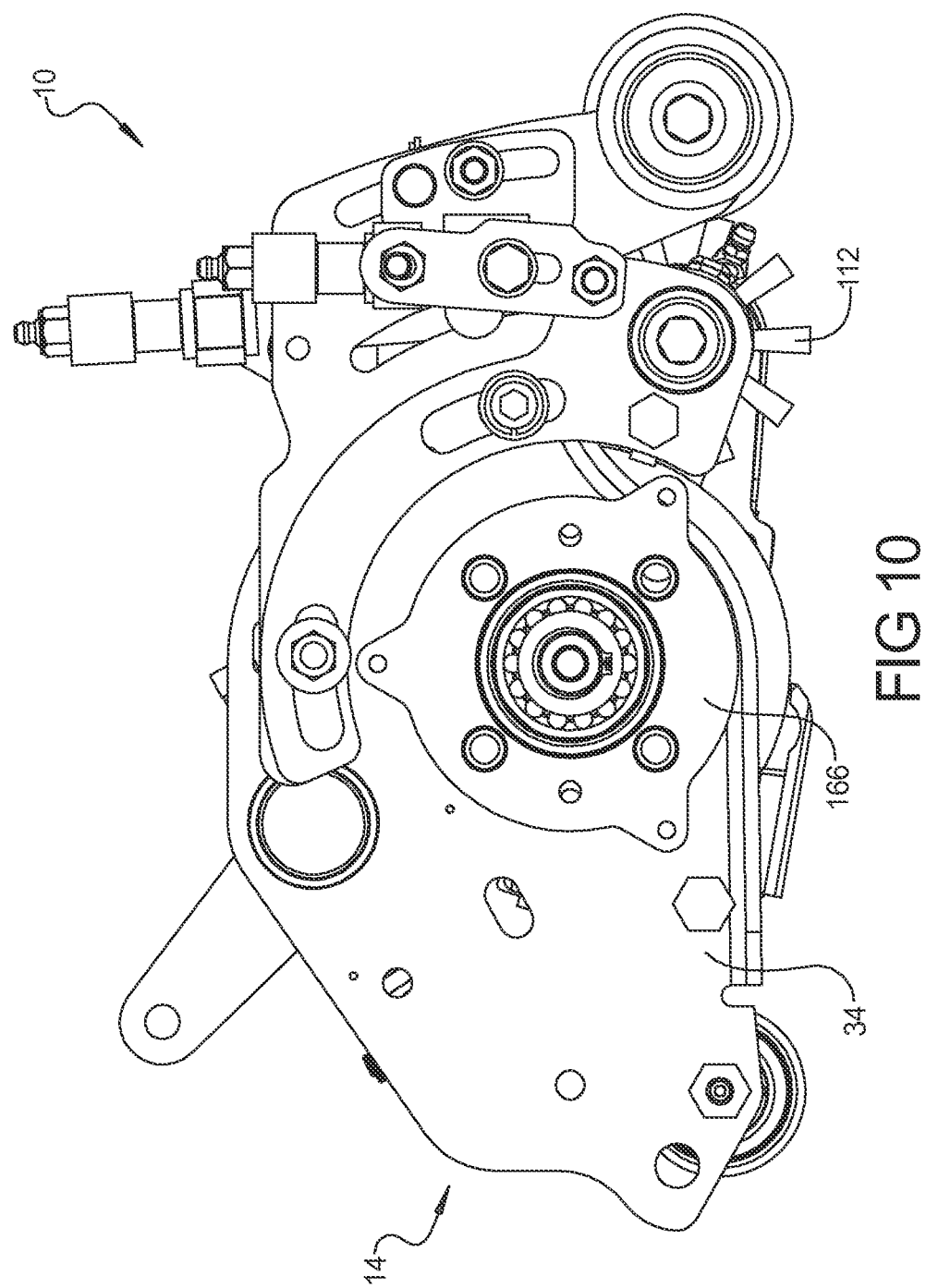
FIG. 10 is a right end elevational view of the system of FIG. 5.

Referring to FIG. 2 and again to FIG. 1, groomer device 18 is shown in its installed position and is axially rotated by powered rotation of reel blade shaft 13. Reel blade shaft 13 is connected to a device such as an electric or hydraulic motor (described in reference to FIG. 10) which can be mounted to assembly plate 34 and/or right hand frame 20. One or more support wheels 60 (only a single support wheel 60 is shown for clarity) can be rotatably connected to either or both of the extending members 32, 45. According to several aspects, components used to rotatably couple reel blade shaft 13 to groomer device 18 are connected to second accessory attachment assembly 16, thereby providing the drive system capability for attachment member 17 as second accessory attachment assembly 16. The configuration of the drive system can also be reversed such that the electric or hydraulic motor can be mounted to left hand frame 26, without departing from the scope of the present disclosure. The configuration of the drive system can also be arranged such that the electric or hydraulic motor can be mounted to the same side or accessory attachment assembly as the drive system, without departing from the scope of the present disclosure.

A bearing plate 62 connected to left hand frame 26 rotatably supports a reel shaft extending member 64 of reel blade shaft 13. A fastener 66 is used to releasably couple components including a pulley assembly 68 to reel shaft extending member 64, such that pulley assembly 68 co-rotates during rotation of reel blade shaft 13. The assembly plate 46 is one of two movable plates of second accessory attachment assembly 16. A second assembly plate 70 is also rotatably disposed on left hand frame 26 such that each of assembly plate 46 and second assembly plate 70 is individually rotatable with respect to reel blade shaft longitudinal axis 59. A fastener 72 positioned in an elongated slot 74, and a fastener 76 positioned in an elongated slot 78 allow rotation of assembly plate 46 and second assembly plate 70. A fastener 80 positioned in an elongated slot of a link 82, and a fastener 84 positioned in an elongated slot 86 of a connecting link 88 is further received in an elongated slot 89 of extending member 45 to further connect assembly plate 46 and second assembly plate 70 for adjustment using height adjustment member 56 and/or adjustment member 58.

Bi-directional drive system 10 uses multiple gears connected to a drive member such as an oil-less sealed O-ring chain to rotate the groomer device 18. A first gear 90 is connected such as by a spline or key to a stub shaft 91 of the groomer device 18 that extends outwardly from assembly plate 46. The fastener 54 is received via an aperture 92 of stub shaft 91 to couple groomer device 18 to second accessory attachment assembly 16. A second gear 94 has a sealed, self-lubricated bearing with a fastener 96 extending therethrough that defines a rotational axis of the second gear 94. Second gear 94 is an adjustable position gear having fastener 96 slidably displaceable in an elongated slot 95 created in assembly plate 46. Fastener 96 extends into elongated slot 95 and engages a T-nut (not shown) on an opposite side of assembly plate 46 that allows second gear 94 to be displaced in either of opposed directions "$Z_1$" or "$Z_2$" by loosening fastener 96 and manually moving second gear 94. A third gear 98 similar to second gear 94 has a sealed, self-lubricated bearing but is fixed in its location with respect to assembly plate 46 by a fastener 100 such that third gear 98 rotates with respect to the longitudinal axis of fastener 100. Each of the second and third gears 94, 98 are lubricated/sealed such that no subsequent gear bearing lubrication is required.

Figure 5:
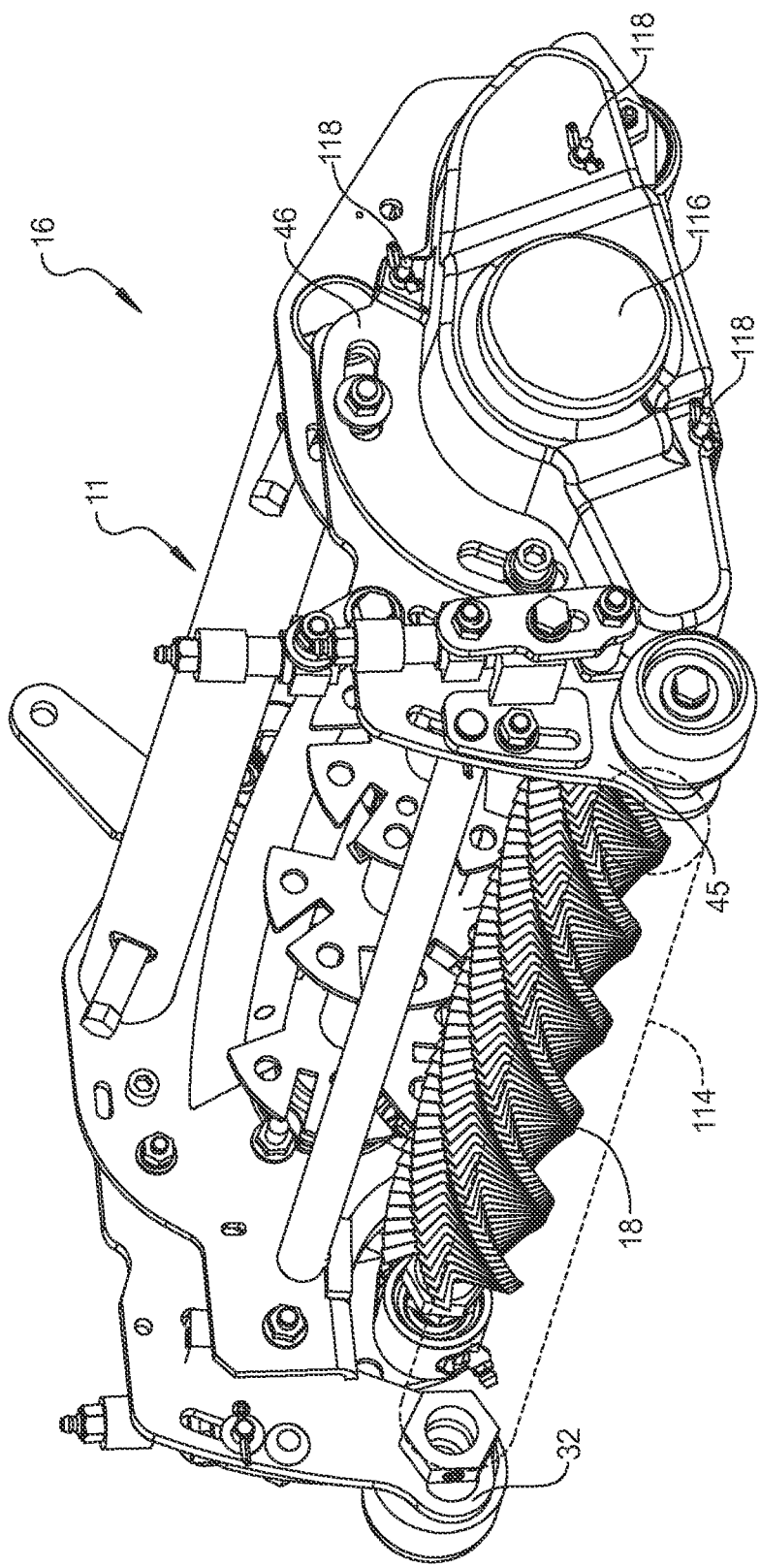
FIG. 5 is a left side end elevational perspective view of a fully assembled system.

According to several aspects, a drive member 102 can be a sealed/lubricated, ANSI standard #35 O-ring roller chain, hereinafter referred to as roller chain 102, which is engaged with the first, second and third torque transfer members 90, 94, 98, herein after referred to as first, second and third gears 90, 94, 98, as well as a reel shaft gear shown and described with reference to FIG. 3, such that rotation of reel blade shaft 13 causes rotation of stub shaft 91 and thereby the groomer device 18. Drive member 102 can also be a belt or similar device for transferring rotation force from the reel blade shaft 13 to the attachment member 17. Threaded shank fasteners 104, 106, 108 are also connected to assembly plate 46 and extend outwardly therefrom. Fasteners 104, 106, 108 are used to releasably retain a cover shown and described in reference to FIG. 5.

Figure 3:
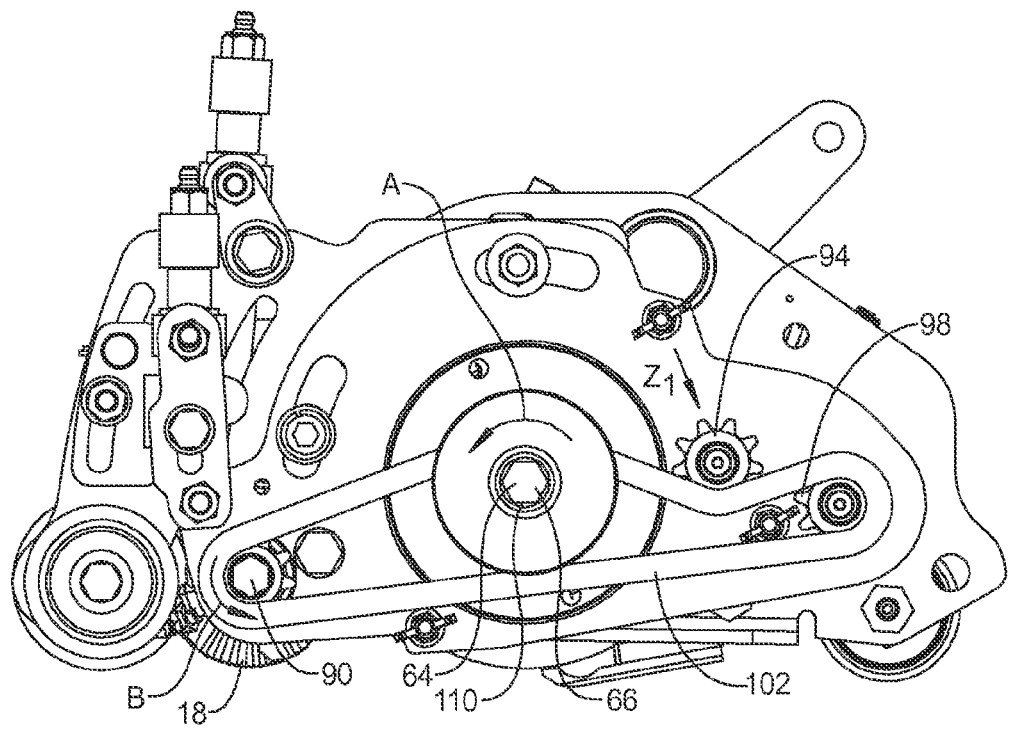
FIG. 3 is a left side elevational view of the system of FIG. 1 configured for a first attachment member rotation direction.

Referring to FIG. 3, a groomer device operating configuration is shown for bi-directional drive system 10. A reel shaft gear 110 is retained on reel shaft extending member 64 of reel blade shaft 13 by fastener 66 which as previously noted is also used to releasably couple pulley assembly 68 to reel shaft extending member 64. Reel shaft gear 110 is coupled to roller chain 102 above the longitudinal axis 59 of reel blade shaft 13 and below the center axis of fastener 96 of second gear 94. Rotation of reel blade shaft 13 in a counterclockwise axial rotation direction "A" causes rotation of groomer device 18 in a counterclockwise attachment device first axial rotation direction "B". Tension of roller chain 102 can be increased by displacement of second gear 94 in a gear displacement direction $Z_1$.

Figure 2:
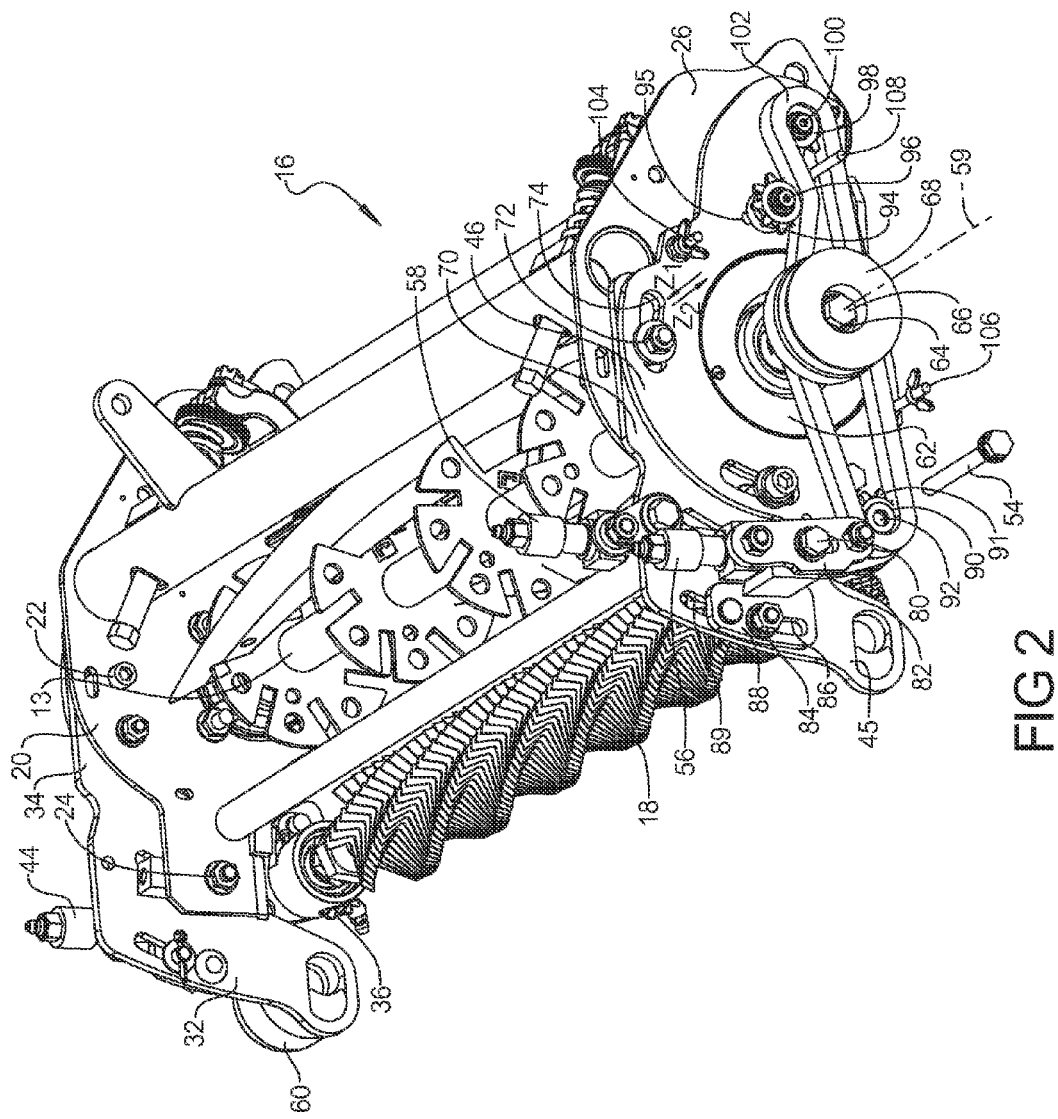
FIG. 2 is a left side elevational perspective view of the system of FIG. 1.
Figure 4:
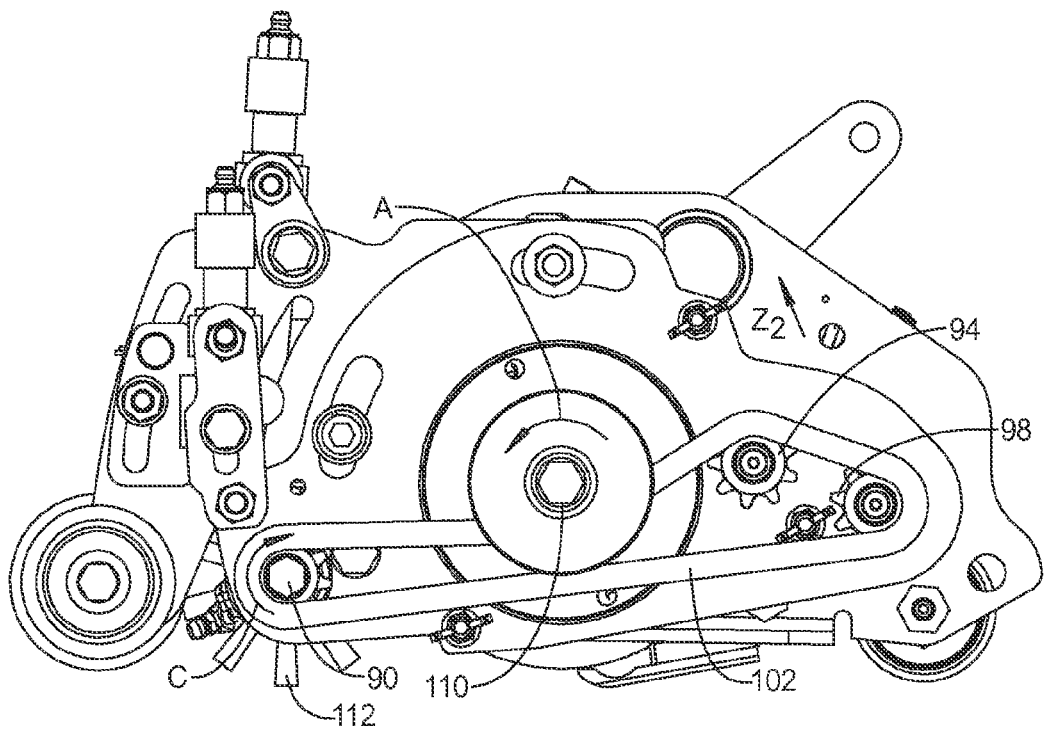
FIG. 4 is a left side end elevational view of the system of FIG. 1 configured for a second attachment member rotation direction.

Referring to FIG. 4 and again to FIGS. 1-3, according to further aspects of bi-directional drive system 10, the attachment member 17 can be a brush device 112 which is directly substituted for the groomer device 18. Brush device 112 is similar in size to groomer device 18 and releasably attaches to the drive housings 36, 48 in a similar manner as groomer device 18. A brush device operating configuration is herein shown for bi-directional drive system 10. In this configuration, reel shaft gear 110 is coupled to roller chain 102 below the longitudinal axis 59 of reel blade shaft 13 and above the center axis of fastener 96 of second gear 94. Rotation of reel blade shaft 13 in the counterclockwise rotation direction "A" in this configuration causes an opposite axial rotation in a clockwise attachment device second axial rotation direction "C" of brush device 112. By selective arrangement of roller chain 102, brush device 112 can therefore rotate in either the same or an opposite axial direction of rotation with respect to reel blade shaft 13. In this configuration a tension on roller chain 102 can be increased by displacement of second gear 94 in a gear displacement direction $Z_2$ following installation of brush device 112.

With continuing reference to both FIGS. 3 and 4 and again to FIGS. 1-2, it is noted the geometry of first, second and third gears 90, 94, 98, together with reel shaft gear 110 is predetermined such that the same roller chain 102 can be used for both the groomer device and brush device operating configurations. The groomer device 18 and/or the brush device 112 can be interchanged as follows. Fastener 96 is loosened and the second gear 94 is displaced to the far end of elongated slot 95 (in either the gear displacement direction $Z_1$ or $Z_2$) from the roller chain tensioned position. This permits the roller chain 102 to be moved between the configurations shown in FIGS. 3 and 4. The fasteners 42, 54 are removed and either the groomer device 18 or the brush device 112 is installed in place of its counterpart. After reinstalling and torqueing fasteners 42, 54 the second gear is displaced to tension roller chain 102, and fastener 96 is torqued. The only components that are changed to shift from the grooming to the brushing operation or from the brushing to the grooming operation are therefore the groomer device 18 and the brush device 112. No height or other operating adjustment is required unless desired. No fasteners are used in either configuration that are not required in the other configuration. In addition, neither of the first or second accessory attachment assemblies 14, 16 are removed or replaced to change between grooming and brushing operations.

Referring to FIG. 5 and again to FIGS. 1-4, in addition to either the groomer device 18 or the brush device 112, a roller 114 can also be supported forward of the groomer device 18 or brush device 112. The roller 114 is releasably connected to each of the extending members 32, 45. In the assembled condition of reel deck assembly 11 of bi-directional drive system 10 shown, a cover 116 can also be attached to the assembly plate 46 of second accessory attachment assembly 16 using fastener nuts 118 such as wing nuts attached to each of the threaded fasteners 104, 106, 108. Cover 116 encompasses all of the gears including first, second and third gears 90, 94, 98 and the reel shaft gear 110, as well as the roller chain 102.

Figure 6:
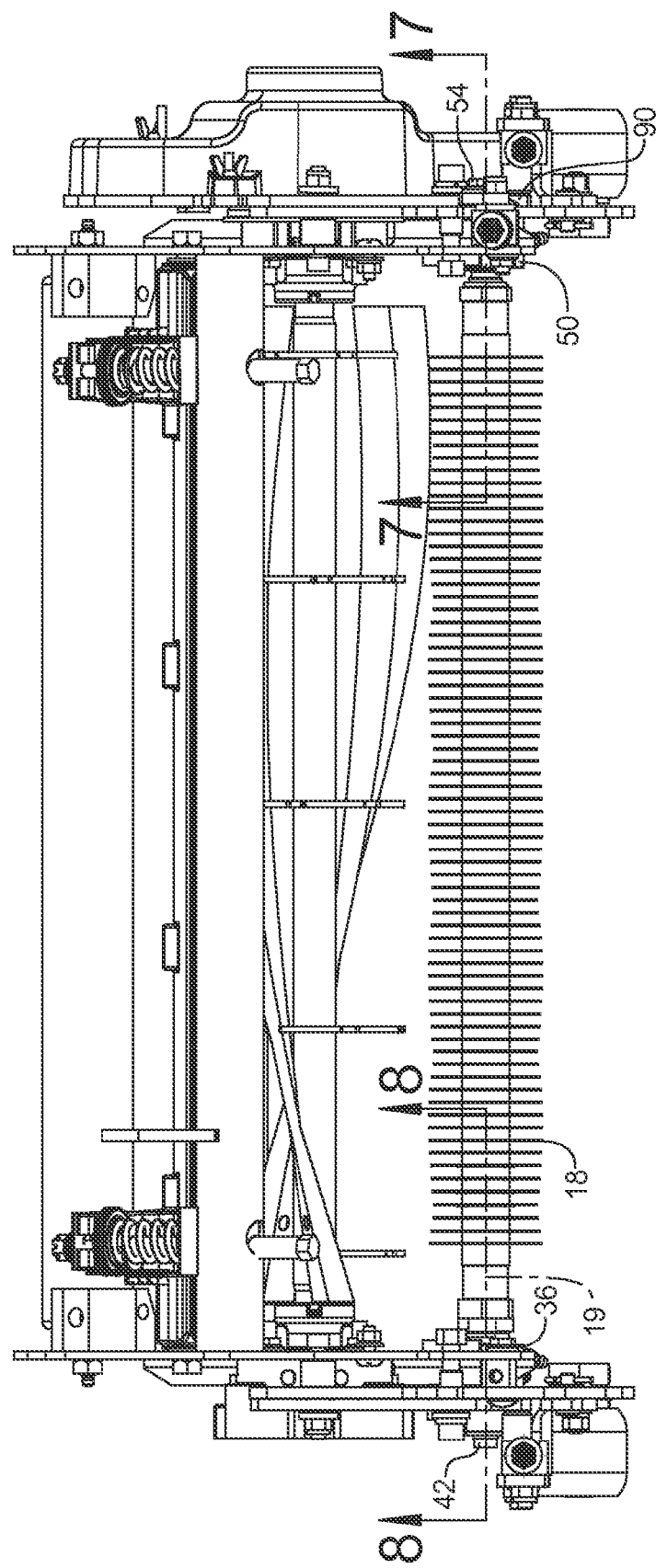
FIG. 6 is a top plan view of the system of FIG. 5.

Referring to FIG. 6, the installed position of the groomer device 18 positions the longitudinal axis 19 of groomer device 18 in coaxial alignment with the longitudinal axes of the fasteners 42, 54. The groomer device 18 is supported by stub shafts 91 and 142 (shown and described in reference to FIG. 8) which are rotatably supported by the drive housings 36, 48, such that rotation of first gear 90 directly rotates the stub shaft 91 and thereby rotates groomer device 18. It is noted the brush device 112 can be directly substituted for the groomer device 18, thereby providing the same orientation and axial rotation of the brush device 112 with respect to the longitudinal axes of the fasteners 42, 54.

Figure 7:
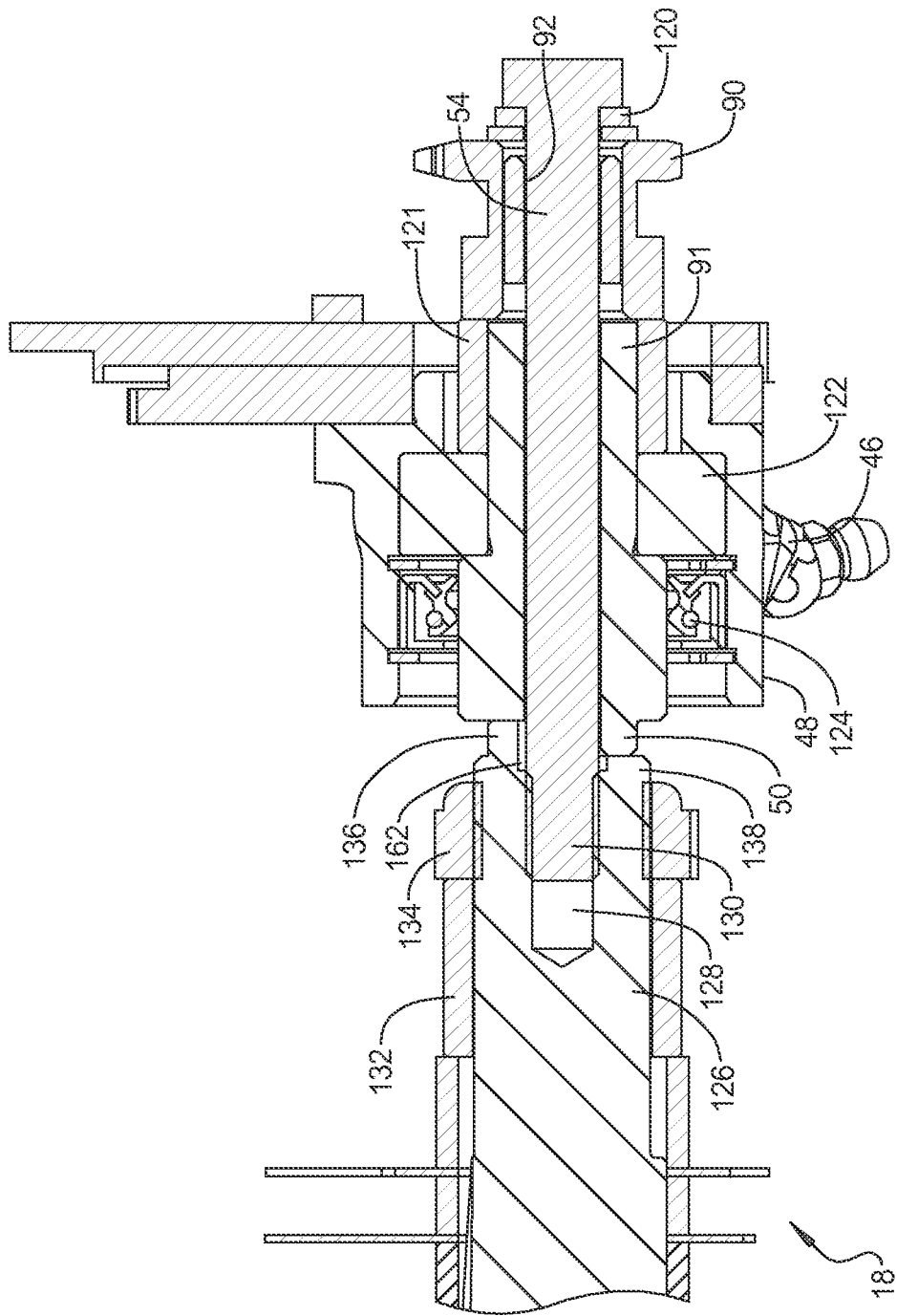
FIG. 7 is a front elevational cross sectional view taken at section 7 of FIG. 6.

Referring to FIG. 7, a releasable positive drive connection is provided by the design of drive housing 48 as follows. A similar configuration (not shown) is also provided for installation of the brush device 112. The fastener 54 is slidably disposed through aperture 92 of the stub shaft 91 having a washer 120 contacting the first gear 90. A portion of stub shaft 91 extends into and positively engages first gear 90. A spacer 121 is positioned externally to stub shaft 91 between and in direct contact with each of the first gear 90 and a bearing 122 positioned in the drive housing 48. Bearing 122 permits axial rotation of stub shaft 91 within drive housing 48. A seal 124 is also received in drive housing 48 which retains a lubricant such as grease within drive housing 48 for lubricated bearing 122 and thereby aiding rotation of stub shaft 91. The groomer device 18 includes a groomer shaft 126 having an open-ended internally threaded bore 128 which is threadably engaged by a threaded shank 130 of fastener 54. A spacer 132 slidably received about a perimeter of groomer shaft 126 is retained by a nut 134. A portion of the groomer shaft 126 extends past nut 134 which creates a half-moon shaped member 136 directly contacted by stub shaft 91. A similar half-moon shaped member defines the positive engagement drive member 50 of stub shaft 91. The member 136 directly contacts the positive engagement drive member 50 such that rotation of stub shaft 91 directly rotates the groomer shaft 126. The fastener 54 is therefore not relied on to provide positive engagement for driving groomer device 18, but is used to ensure positive coupling between the stub shaft 91 and groomer shaft 126. Fastener 54 and stub shaft 91 therefore both co-rotate together with groomer shaft 126.

Figure 8:
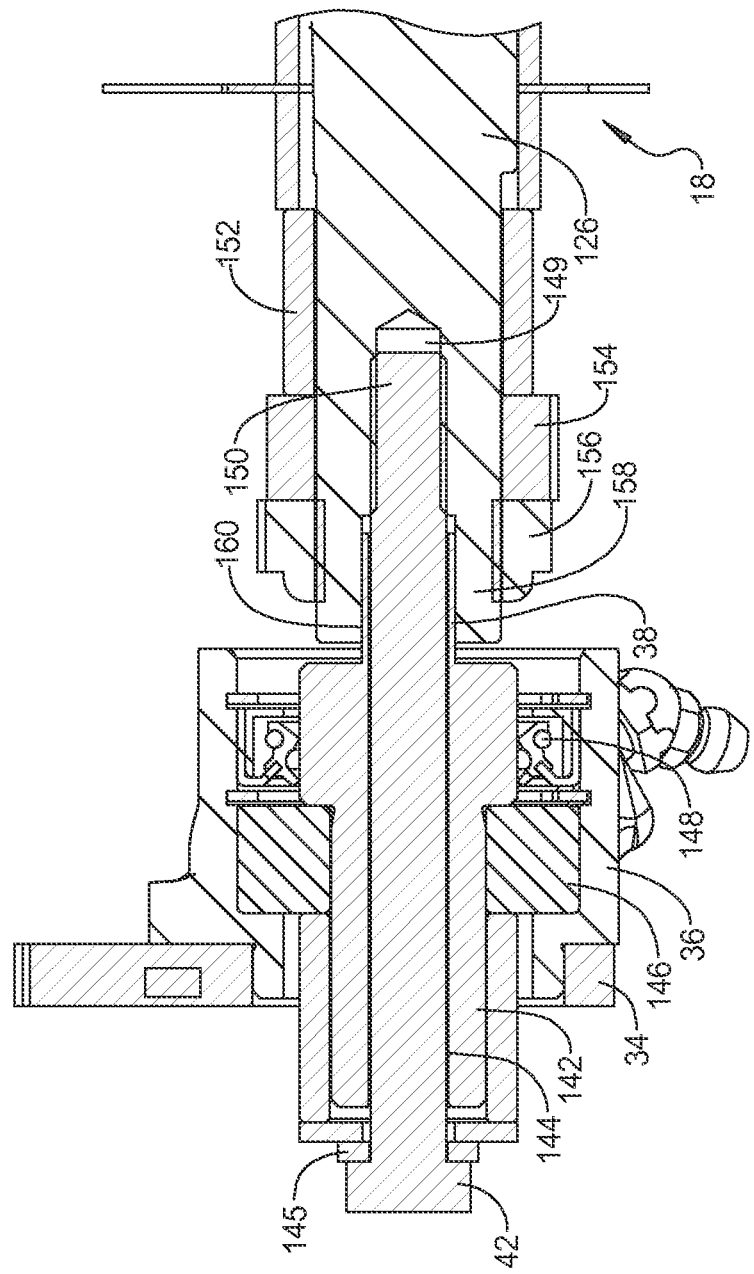
FIG. 8 is a front elevational cross sectional view taken at section 8 of FIG. 6.

Referring to FIG. 8, a releasable, positive drive connection is also provided by the design of drive housing 36 as follows. The fastener 42 is slidably disposed through a stub shaft 142 via a through aperture 144 of stub shaft 142 having a washer 145 positioned between a head of fastener 42 and the drive housing 36. Stub shaft 142 is rotatably supported by a bearing 146 positioned in the drive housing 36. A seal 148 is also received in drive housing 36 which retains a lubricant such as grease within drive housing 36 for aiding rotation of stub shaft 142. The groomer shaft 126 further includes a second open-ended internally threaded bore 149 which is threadably engaged by a threaded shank 150 of fastener 42. A spacer 152 slidably received about a perimeter of groomer shaft 126 is retained by a jam nut 154 and a threaded nut 156. An end portion 158 of the groomer shaft 126 positioned within or proximate to nut 156 includes a rectangular shaped cavity 160. A similar rectangular shaped member defines the positive engagement drive member 38 of stub shaft 142. The positive engagement drive member 50 received in cavity 160 provides a positive engagement connection such that rotation of the groomer shaft 126 also co-rotates the stub shaft 142 which freely rotates within bearing 146. The fastener 42, similar to fastener 54 is therefore not relied on to provide positive engagement for operation of groomer device 18, but is used to ensure positive coupling between the stub shaft 142 and groomer shaft 126. Fastener 42 and stub shaft 142 therefore both co-rotate together with groomer shaft 126. It is noted items such as spacers 132, 152 can be omitted for the brush device 112.

Referring again to FIGS. 6-8, when removal of groomer device 18 is desired, the only components as a minimum that require removal with groomer device 18 are fasteners 42 and 54. Due to the half-moon shapes of member 136 and the positive engagement drive member 50 of stub shaft 91, an opening 162 is created by selective axial rotation of member 136 with respect to the positive engagement drive member 50 which allows displacement of groomer device 18 in a direction substantially normal to the longitudinal axis 19 (for example toward the viewer as seen in FIG. 7) until member 136 clears positive engagement drive member 50. At this time, the groomer device is pulled in a direction substantially parallel with the longitudinal axis 19 allowing the end portion 158 to slidably pull free such that positive engagement drive member 38 is retracted out of cavity 160.

A new or different groomer device 18, a repaired groomer device 18, or a brush device 112 can then be installed by reversing the removal steps above. The minimum number of steps to replace groomer device 18 and/or the brush device 112, therefore include only steps for removal and reinstallation of fasteners 42, 54. If the rotation direction of either the groomer device 18 or the brush device 112 is also desired, cover 116 is removed and the second gear 94 is displaced by loosening fastener 96 such that roller chain 102 can be repositioned to either one of the configurations shown in FIG. 3 or 4. The roller chain 102 is then tensioned by displacement of second gear 94 followed by tightening of fastener 96, and cover 116 is reinstalled.

If the threaded shank 150 of fastener 42 is replaced by a sliding or frictional fit end of the fastener, when removal of groomer device 18 is desired, the only component as a minimum that requires removal with groomer device 18 is one of the fasteners, such as fastener 54. In these aspects, the open-ended threaded bore 149 is replaced by an open-ended unthreaded bore which is engaged by an unthreaded shank of fastener 42, with fastener 42 therefore acting similar to a pin. Removal of only fastener 54 in these aspects will therefore allow removal of groomer device 18. In the alternative, if positive contact is maintained between the half-moon shapes of member 136 and the positive engagement drive member 50 of stub shaft 91, fastener 54 can act as a pin, and fastener 42 can be threadably engaged as previously described herein.

Figure 9:
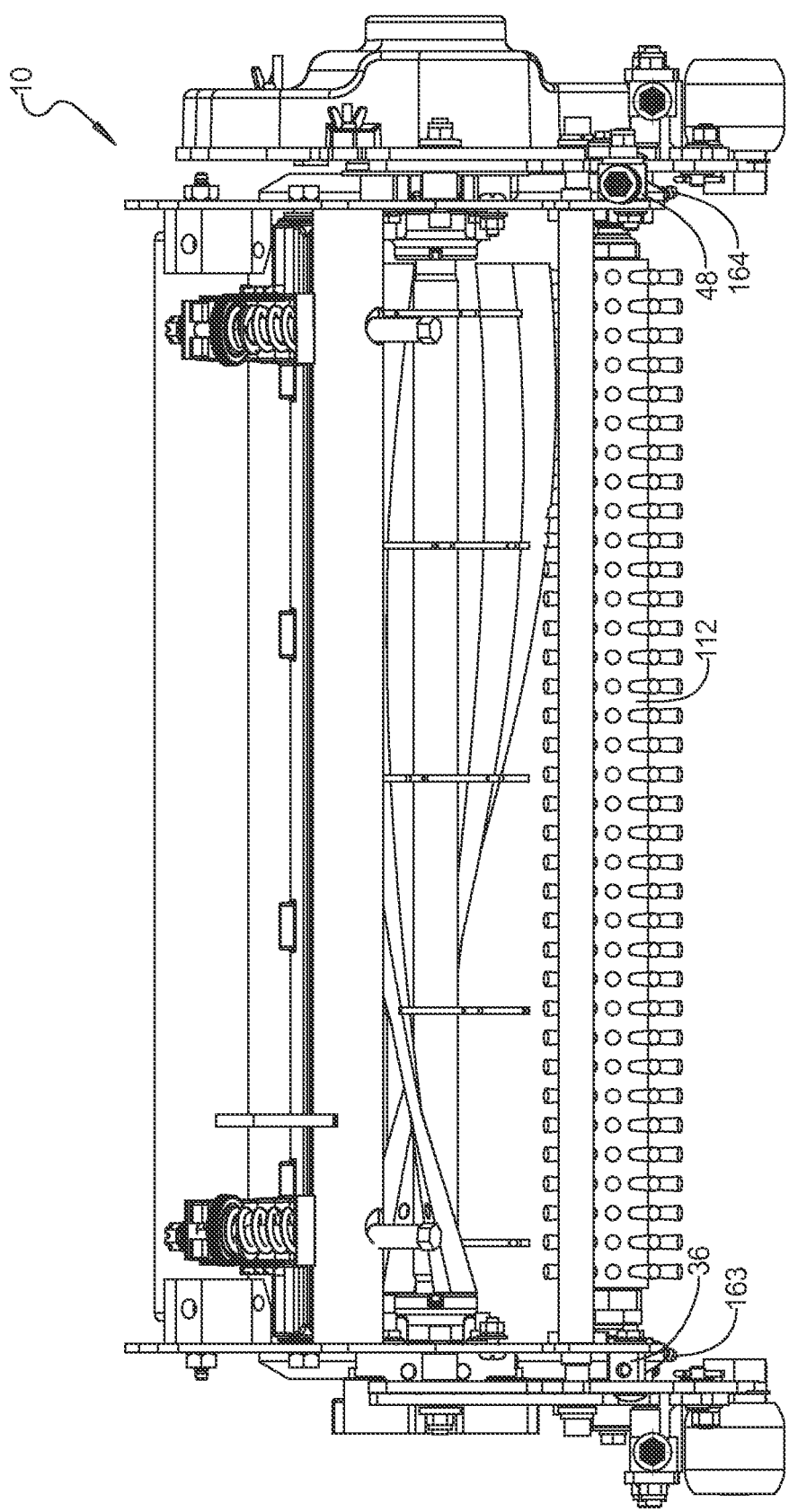
FIG. 9 is a front elevational view of the system of FIG. 5.

Referring to FIG. 9 and again to FIGS. 4-5 and 7-8, the brush device 112 when installed and rotatably connected to the drive housings 36, 48. The bearings in the drive housings 36, 48 can be lubricated using lubrication fittings 163, 164 individually extending from one of the drive housings 36 or 48. As previously noted, the groomer device 18 can be installed in place of brush device 112. Rotation of groomer device 18 is therefore also supported by lubrication fittings 163, 164.

Referring to FIG. 10 and again to FIGS. 1-9, the assembly plate 34 of first accessory attachment assembly 14 can be used for mounting a drive unit 166. Drive unit 166 is connected to and rotates reel blade shaft 13, and as described herein therefore also co-rotates the attachment member 17, shown in FIG. 10 as the brush device 112. According to several aspects drive unit 166 can be an electric motor or a hydraulic motor. The components of first and second attachment assemblies 14, 16 can also be reversed from that shown in the figures herein, whereby drive unit 166 is provided with second accessory attachment assembly 16, and the reel shaft gear 110, roller chain 102 and first, second and third gears 90, 94, 98 are provided for with first accessory attachment assembly 14.

The motor and drive components (chain and gears) can also be all combined on one of the first or second attachment assemblies 14, 16.

According to several aspects, the bi-directional drive system 10 for turf grooming and turf brushing operations includes a first positive engagement member (38 or 50) rotatably connected to reel deck assembly 11. Attachment member 17 is releasably connected to the first positive engagement member and is axially rotated in either a first "B" or an opposite second "C" axial rotation direction. Fastener (42 or 54) releasably couples the attachment member 17 to the first positive engagement member. Removal of the attachment member 17 from the reel deck assembly 11 is provided for by release of only the fastener (42 or 54).

According to several aspects, the bi-directional drive system 10 for turf grooming and turf brushing operations includes opposingly directed first and second positive engagement members 38, 50 each rotatably connected to the reel deck assembly 11. The attachment member 17 is releasably connected to each of the first and second positive engagement drive members 38, 50 and is axially rotated in either a first axial rotation direction "B" or an opposite second axial rotation direction "C". First and second fasteners 42, 54 are individually received in a through aperture 144, 92 of one of the first or second positive engagement drive members 38, 50 and engaged with the attachment member 17 to releasably couple the attachment member 17 to the first and second positive engagement drive members 38, 50. Removal of the attachment member 17 from the reel deck assembly 11 is provided for by release of only the first and second fasteners 42, 54.

According to several aspects, the bi-directional drive system 10 for turf grooming and turf brushing operations includes reel deck assembly 11 having reel blade assembly 12 rotatably supported on reel blade shaft 13 which is rotated in the reel blade shaft rotation direction "A". The first positive engagement member 38 is rotatably connected to the reel deck assembly 11. The attachment member 17 is releasably connected to the first positive engagement member 38 and is axially rotated in the selectable first attachment member axial rotation direction "B" the same as the reel blade shaft rotation direction "A", or the second attachment member axial rotation direction "C" opposite to the reel blade shaft rotation direction "A".

According to further aspects, the bi-directional drive system 10 for turf grooming and turf brushing operations includes reel blade assembly 12 supported on reel blade shaft 13 which is rotatably connected to the reel deck assembly 11. Opposingly directed first and second engagement members 38, 50 are each rotatably connected to the reel deck assembly 11. An attachment member 17 is releasably connected to each of the first and second engagement members 38, 50 and axially rotated in either a first "B" or an opposite second "C" axial rotation direction. The first axial rotation direction "B" matches a rotation direction "A" of the reel blade shaft 13 and the second axial rotation direction "C" is opposite to the rotation direction "A" of the reel blade shaft 13. First and second fasteners 42, 54 individually received in a through aperture 144, 92 of one of the first or second engagement members 38, 50 and engaged with the attachment member 17 releasably couple the attachment member 17 to the first and second engagement members 38, 50. Removal of the attachment member 17 from the reel deck assembly 11 is provided for by release of only the first and second fasteners 42, 54.

The bi-directional drive system 10 of the present disclosure offers several advantages, including the following. 1) Use of the same basic accessory attachment system allows deployment of either brushes or groomers on a cutting reel deck; 2) The use of only 2 fasteners 42, 54 retaining either the brush device 112 or groomer device 18 permits rapid change times between the groomer and the brush systems or to replace a groomer device or brush device with a like device; 3) a predefined positioning of an assembly of gears provides for reconfigurable accessory drive components to drive either the groomer or brush system in either forward or reverse directions; and 4) The drive system uses a lubrication-free roller chain 102 and gear system (gears 94, 98 are permanently lubricated and sealed) so no lubrication is required for maintenance of the chain or gears.

Referring to FIG. 11 and again to FIGS. 1-3, a bi-directional drive system 168 of a reel deck assembly 169 is modified from bi-directional drive system 10 to provide for an alternate drive belt configuration, increasing an operating efficiency. A groomer device operating configuration is shown for bi-directional drive system 168. An assembly plate 170 is modified from assembly plate 46 to provide for an alternate gear and pulley assembly. Reel shaft gear 110' is again retained on reel shaft extending member 64' of reel blade shaft 13' by fastener 66' which as previously noted is also used to releasably couple pulley assembly 68' to reel shaft extending member 64'. A first single sided cogged belt 172 is coupled to reel shaft gear 110' which is centered with respect to the longitudinal axis 59 of reel blade shaft 13, and first single sided cogged belt 172 is further coupled to a horizontal position adjustable first gear 174. A cogged inner face 173 of first single sided cogged belt 172 is directly engaged with both the reel shaft gear 110' and the first gear 174 to rotate groomer device 18'. First single sided cogged belt 172 is made of a resilient material similar to rubber or a polymeric material, which reduces a rotational friction and therefore reduces a power loss for operation of bi-directional drive system 168 compared to the use of a chain in place of first single sided cogged belt 172.

Rotation of reel blade shaft 13 in the counterclockwise axial rotation direction "A" causes rotation of first gear 174 connected to assembly plate 170 and of groomer device 18' in a counterclockwise attachment device first axial rotation direction "B", and therefore the same as rotation direction "A". Tensioning and/or removal or replacement of first single sided cogged belt 172 is achieved by use of a tensioning adjustment fastener 176, which when loosened permits displacement of first gear 174 toward the reel shaft gear 110'. Displacement of first gear 174 is used to adjust a tension of first double sided cogged belt 172. This is in contrast to the fixed position of first gear 90 of bi-directional drive system 10. The tension of first single sided cogged belt 172 can be increased by 1) releasing the setting torque of a tensioning adjustment fastener 176; 2) displacing first gear 174 in a gear displacement direction "AA"; and 3) re-tensioning tensioning adjustment fastener 176. The tension of first single sided cogged belt 172 can be decreased by releasing the setting torque of tensioning adjustment fastener 176 and displacing first gear 174 in an opposite gear displacement direction "AB".

Bi-directional drive system 168 further includes axially rotated but fixed position second and third gears 178, 180. Second gear 178 is relocated further forward (to the left as viewed in FIG. 11) with respect to second gear 94 of bi-directional drive system 10. Third gear 180 is positioned similar to third gear 98 of bi-directional drive system 10. The single sided cogged belt 172 is not engaged with either of the second or third gears 178, 180 during rotation of groomer device 18' in the counterclockwise attachment device first axial rotation direction "B".

Referring to FIG. 12 and again to FIGS. 1-3 and 11, similar to bi-directional drive system 10 the attachment member 17 of bi-directional drive system 168 can be brush device 112' which is directly substituted for groomer device 18'. Brush device 112' is similar in size to groomer device 18' and releasably attaches to the drive housings 36, 48 in a similar manner as groomer device 18'. A brush device operating configuration is herein shown for bi-directional drive system 168, which defines a second operating direction "C" which is reversed compared to first axial rotation direction "B". In this configuration, a second belt configured as a double sided cogged belt 182 replaces the first single sided cogged belt 172. Second double sided cogged belt 182 is coupled to reel shaft gear 110' below the longitudinal axis 59 of the reel blade shaft 13. Second double sided cogged belt 182 is made of a similar material as first single sided cogged belt 172, but is longer to permit double sided cogged belt 182 to further engage each of the second and third gears 178, 180 as well as first gear 174.

Rotation of reel blade shaft 13 and thereby rotation of reel shaft gear 110' in the counterclockwise rotation direction "A" in this configuration causes an opposite axial rotation in the clockwise attachment device second axial rotation direction "C" of brush device 112'. By using a double sided cogged belt in place of a chain, a cogged inside face 184 of double sided cogged belt 182 engages each of the first, second and third gears 174, 178, 180, while a cogged outside face 186 of double sided cogged belt 182 engages the outside of reel shaft gear 110'. The second and third gears 178, 180 act as idler gears for bi-directional drive system 168, each rotating with respect to its own individual fixed central axis. In this configuration, as well as in the previous configuration of bi-directional drive system 168, a tension on second double sided cogged belt 182 is adjusted by displacement of first gear 174 after releasing the holding torque on tensioning adjustment fastener 176.

With continuing reference to both FIGS. 11 and 12 and again to FIGS. 1-3, it is noted the geometry of first, second and third gears 174, 178, 180, together with reel shaft gear 110' require a different double sided cogged belt be used to provide opposite rotation during the groomer device and brush device operating configurations. The groomer device 18 and/or the brush device 112 are interchanged as follows. Tensioning adjustment fastener 176 is loosened and the first gear 174 is displaced in the gear displacement direction "AA" from the double sided cogged belt tensioned position. This permits either the single sided cogged belt 172 or the double sided cogged belt 182 to be removed. The fasteners 42, 54 are removed and either the groomer device 18' or the brush device 112' is installed in place of its counterpart. After reinstalling and torqueing fasteners 42, 54 the first gear 174 is displaced in the gear displacement direction "AB" to tension the single or double sided cogged belt 172 or 182, and then tension adjustment fastener 176 is torqued. No height or other operating adjustment is required unless desired. No fasteners are used in either configuration that are not required in the other configuration. In addition, neither of the first or second accessory attachment assemblies 14, 16 are removed or replaced to change between grooming and brushing operations.

Figure 11:
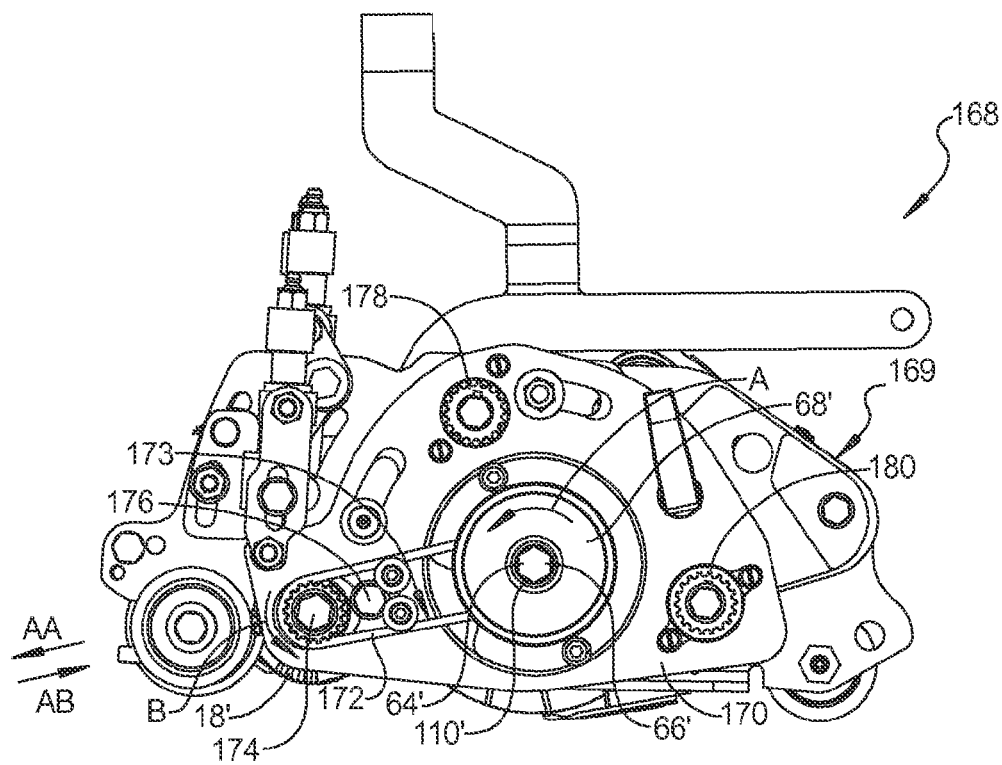
FIG. 11 is a left side elevational view of another embodiment of a bi-directional drive system modified from FIG. 1 configured for the first attachment member rotation direction.
Figure 12:
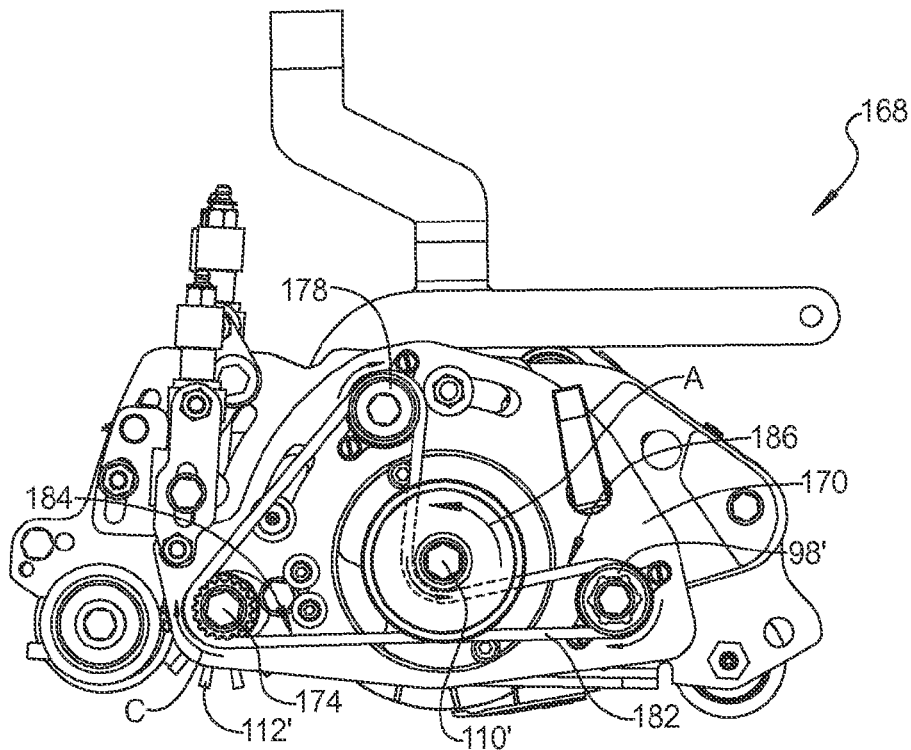
FIG. 12 is a left side end elevational view of the system of FIG. 11 configured for attachment of a second attachment member and rotation in a second rotation direction.
Figure 13:
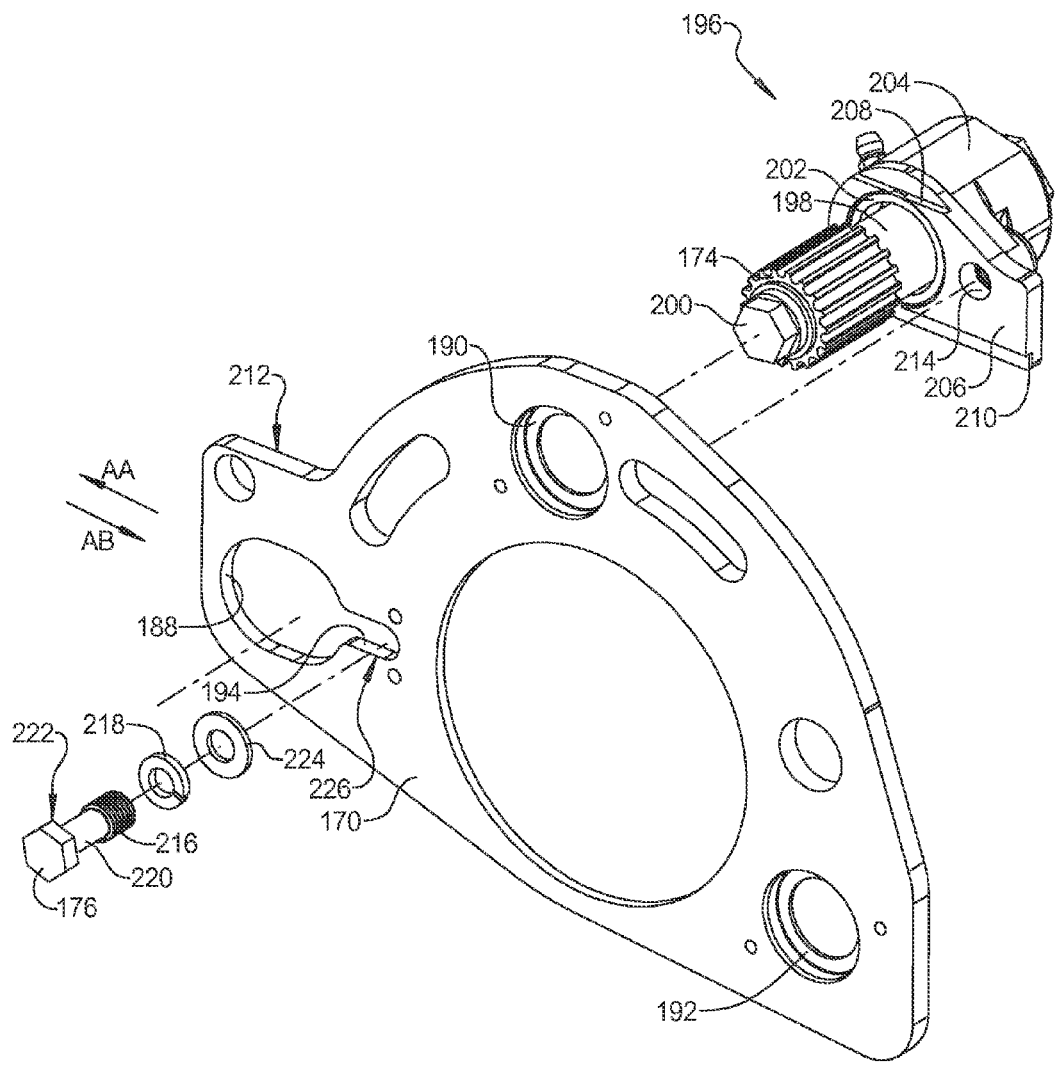
FIG. 13 is an exploded front left perspective view of a first gear assembly and an assembly plate of the bi-directional drive system of FIG. 11.

Referring to FIG. 13 and again to FIGS. 1, 11 and 12, the assembly plate 170 includes an elongated through-bore 188 which receives first gear 174, a first counterbore 190 adapted to receive second gear 178 and a second counterbore 192 adapted to receive third gear 180. The elongated through-bore 186 is elongated in the gear displacement directions "AA" and "AB". A second elongated slot 194 opens into elongated through-bore 188, but is of a smaller size adapted to slidably receive tensioning adjustment fastener 176.

The first gear 174 is part of a gear assembly 196, which includes a tubular sleeve 198 upon which first gear 174 is mounted, a fastener 200 which fixes first gear 174 to the tubular sleeve 198, a sleeve bearing 202 which rotatably receives the tubular sleeve 198, and a drive housing 204, similar to drive housing 48, which retains the sleeve bearing 202. A flange 206 fixed to drive housing 204 can include a first elongated shoulder 208 and a second elongated shoulder 210 parallel to first elongated shoulder 208 but positioned oppositely about tubular sleeve 198 with respect to first elongated shoulder 208. The first and second elongated shoulders 208, 210 are adapted to engage with corresponding male features created on an inward facing side 212 of assembly plate 170 to prevent rotation of drive housing 204 as the tubular sleeve 198 and first gear 174 rotate. An internally threaded bore 214 created in flange 206 which threadably receives a male threaded end 216 of tensioning adjustment fastener 176. A lock washer 218 placed over a shank 220 of tensioning adjustment fastener 176 contacts a drive head surface 222. A flat washer received over the shank 220 contacts the lock washer 218 and an outward facing side 226 of assembly plate 170 as the tensioning adjustment fastener 176 is inserted through the second elongated slot 194 and threadably engaged with internally threaded bore 214.

The position of gear assembly 196 within elongated through-bore 188 is adjusted with the holding torque on tensioning adjustment fastener 176 released, thereby also adjusting a tension on either the first single sided cogged belt 172 or on the second double sided cogged belt 182. To fix the position of gear assembly 196, a holding torque is then applied to tensioning adjustment fastener 176 which pulls flange 206 into contact with assembly plate 170.

According to several aspects, the bi-directional drive system 168 for turf grooming and turf brushing operations includes first gear 174 rotatably and laterally displaceably connected to the reel deck assembly 169. The reel shaft gear 110' is connected to the reel blade shaft 13 of the reel deck assembly 169 and axially rotated in the first axial rotation direction "A". Second and third gears 178, 180 are rotatably connected to the reel deck assembly 169. Either the single or the double sided cogged belt 172 or 182 is engaged to the reel shaft gear 110'. An attachment member defining a turf component 18' is connected to the reel deck assembly 169. The turf component 18' is rotated in the first axial rotational direction "A" by rotation of the reel shaft gear 110' connected to the first gear 174 by the single sided cogged belt 172 without rotation of the second and third gears 178, 180. The turf component as a turf brush 112' is rotated in a second axial rotational direction "C" opposite to the first axial rotational direction by rotation of the reel shaft gear 110' connected to the first, second and third gears 174, 178, 180 by the double sided cogged belt 182.

Figure 14:
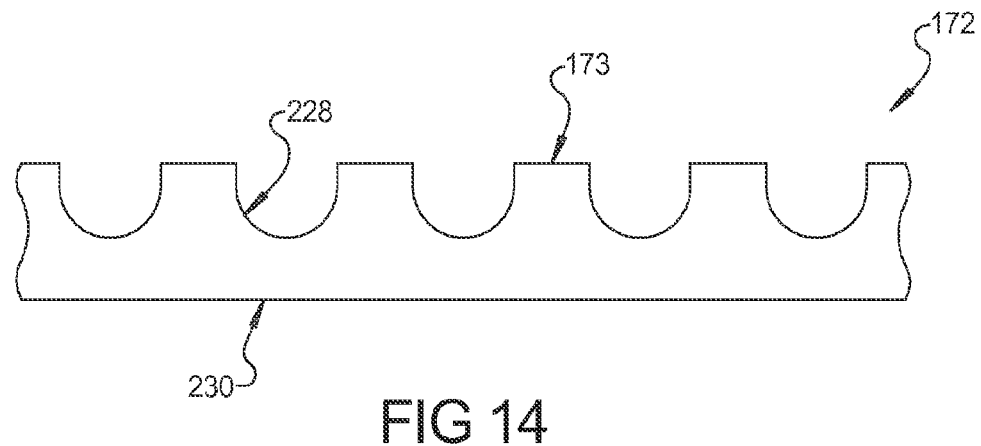
FIG. 14 is a front elevational view of area 14 of FIG. 11.

Referring to FIG. 14 and again to FIG. 11, the single sided cogged belt 172 has multiple indentations 228 created directed outwardly from the inner face 173, which are engaged by individual teeth of the first gear 174 and reel shaft gear 110'. The indentations 228 are oppositely positioned with respect to a substantially continuous outer surface 230.

Figure 15:
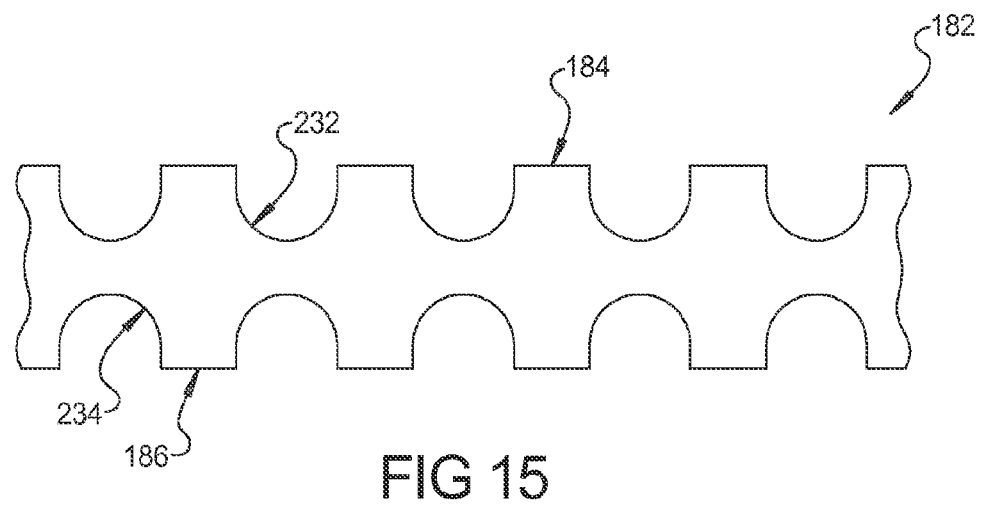
FIG. 15 is a front elevational view of area 15 of FIG. 12

Referring to FIG. 15 and again to FIG. 12, the double sided cogged belt 182 has multiple indentations 232 directed outwardly from the inner face 184, which are engaged by individual teeth of the first gear 174 and the second and third gears 178, 180. The double sided cogged belt 182 further includes multiple indentations 234 created in the outer face 186, which are engaged by individual teeth of the reel shaft gear 110'.

Individual indentations 232 are oppositely directed and oppositely positioned with respect to individual ones of the indentations 234.

Referring to FIG. 16 and again to FIGS. 11-12, with the brush device 112' installed in an exemplary installation, the brush device 112' is supported by an assembly plate 236 and retained in position by a fastener 238 such as a bolt inserted through assembly plate 236 and threadably engaged to a bearing housing 240 positioned outwardly of assembly plate 236. A bearing 242 extends from the bearing housing 240 which is non-rotatably received in a partial circumferential slot 244 created in assembly plate 236. A diameter of bearing 242 substantially matches a diameter of the partial circumferential slot 244 such that bearing 242 is prevented from displacing in a release direction "AC" transverse to a longitudinal axis of brush device 112'. The fastener 238 prevents axial displacement of brush device 112' in an axial displacement direction "AD". A shaft 246 of brush device 112' is rotatably supported by bearing 242 allowing axial rotation of brush device 112'. The arrangement is shown with brush device 112' installed, however, the groomer device 18' can replace brush device 112' in a similar configuration.

Figure 16:
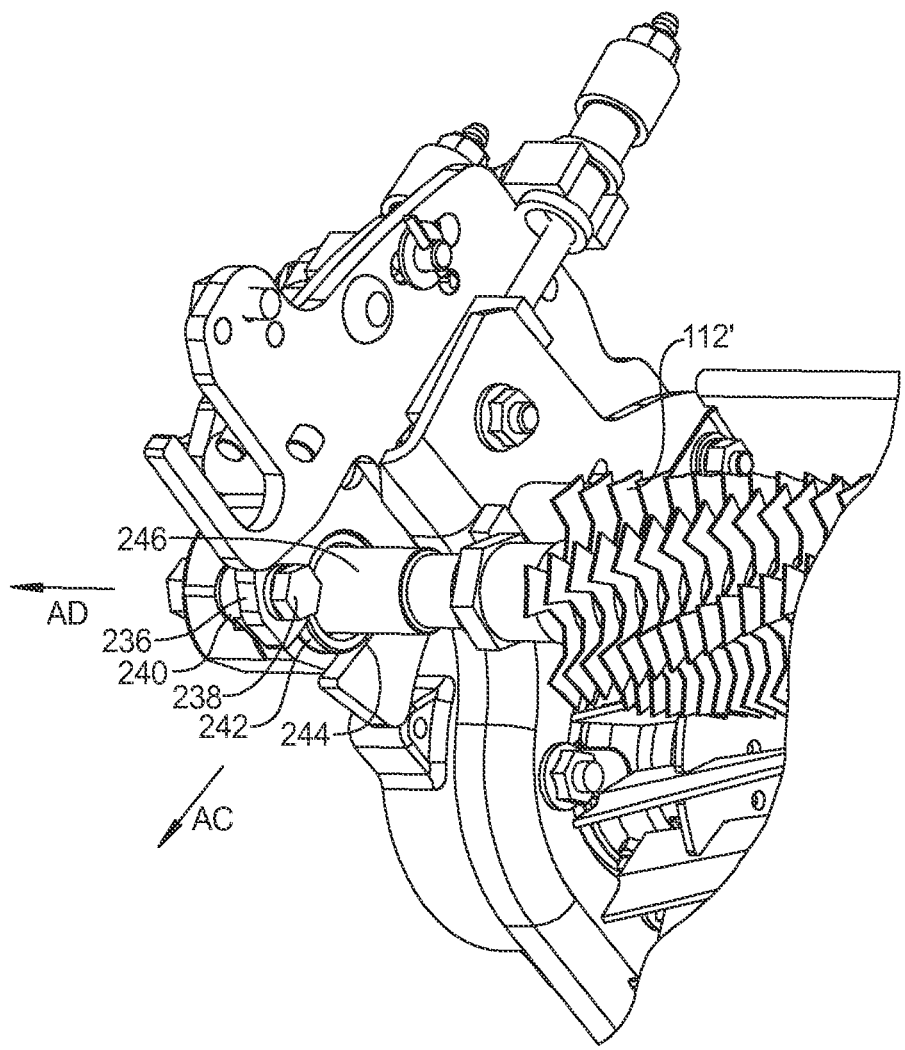
FIG. 16 is a front right perspective view of the bi-directional drive system of FIG. 11 looking outward.

Referring to FIG. 17 and again to FIG. 16, to remove brush device 112' the fastener 138 is unthreaded from a threaded aperture 248 of bearing housing 240 and removed from an unthreaded aperture 250 of the assembly plate 236. The brush device 112' is then displaced in the axial displacement direction "AD" until bearing 242 moves out of partial circumferential slot 244 as shown. From this position of brush device 112', a shaft portion 252 having a smaller diameter than both bearing 242 and partial circumferential slot 244 is positioned within partial circumferential slot 244. From this position, brush device 112' can be moved in the release direction "AC".

Figure 17:
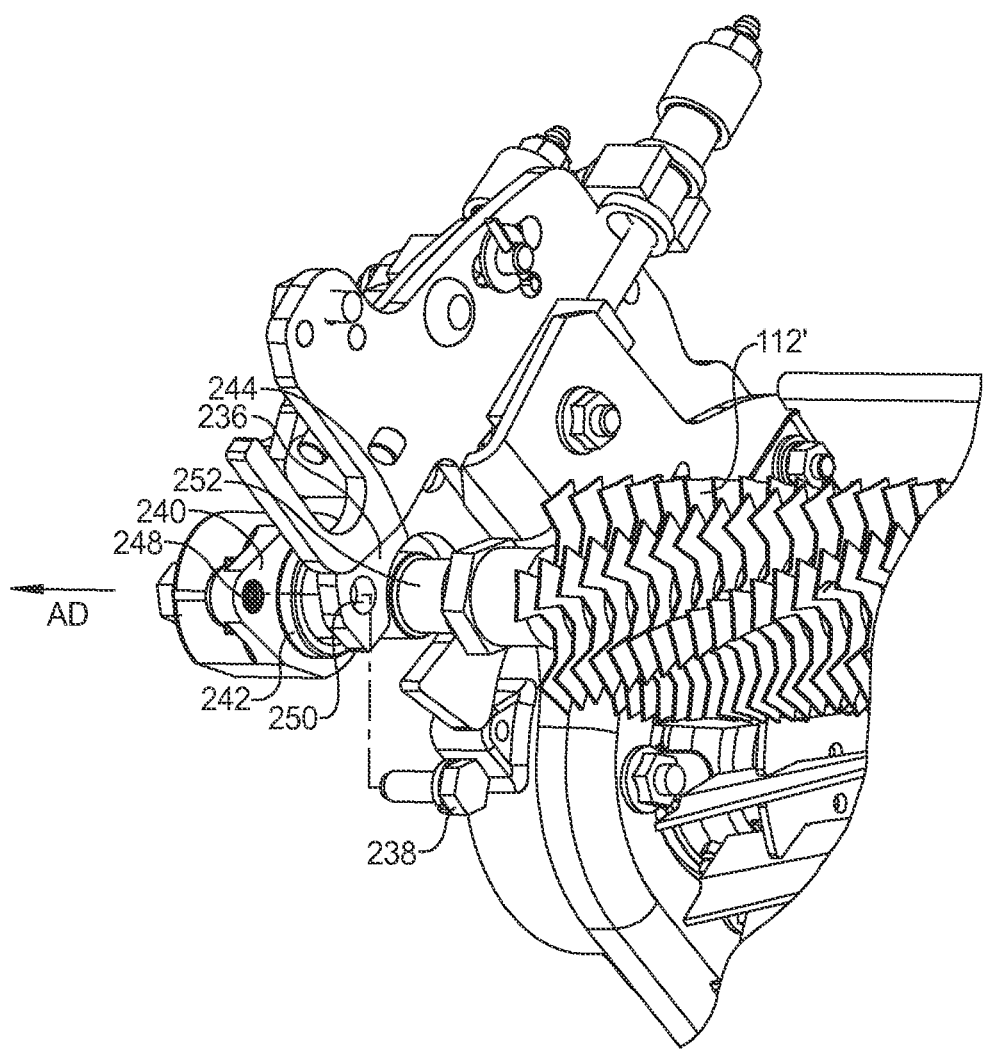
FIG. 17 is a front right perspective view of the bi-directional drive system of FIG. 16 looking outward further showing a partially disassembled condition.
Figure 18:
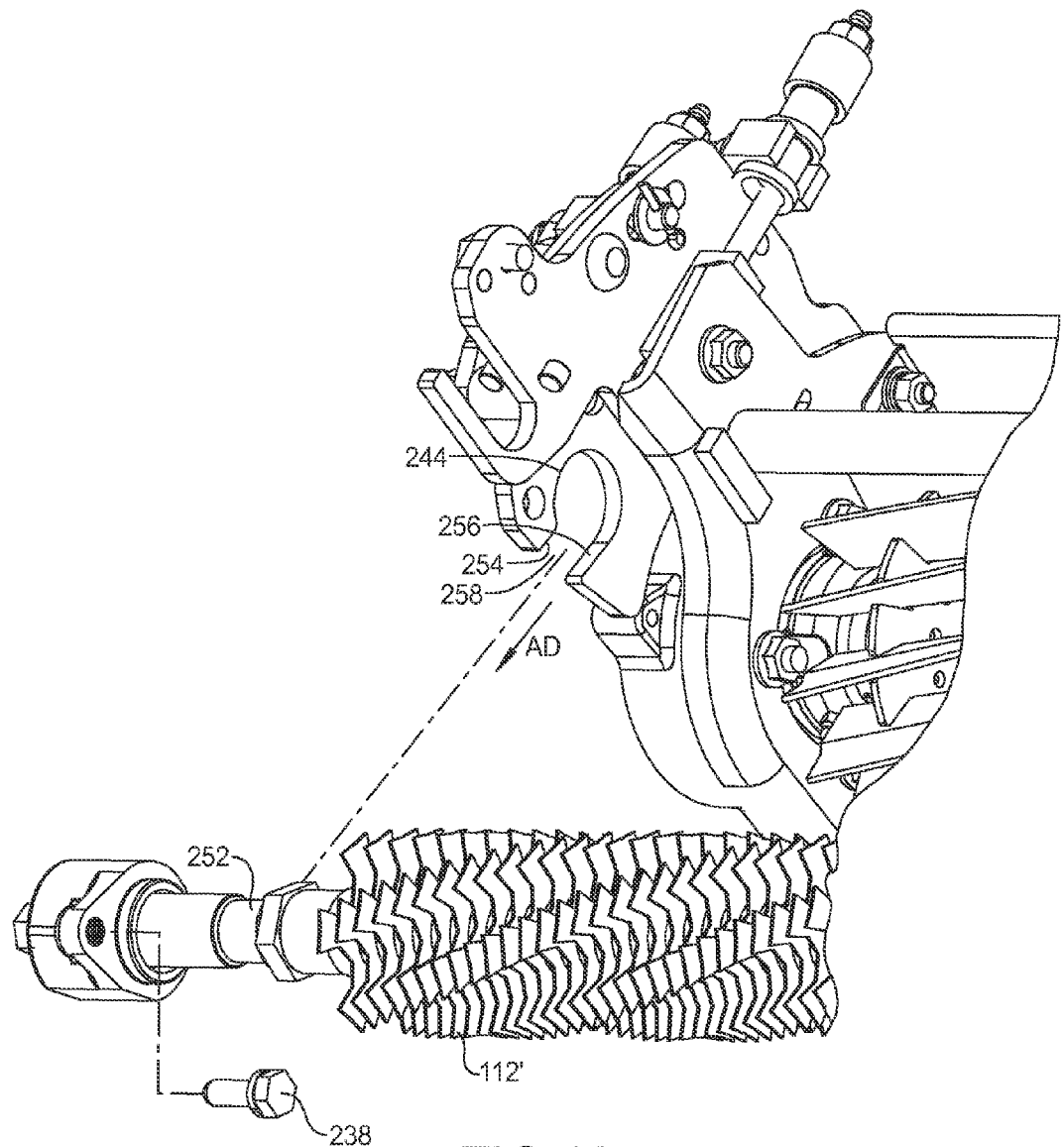
FIG. 18 is a front right perspective view of the bi-directional drive system of FIG. 17 looking outward further showing the brush device removed.

Referring to FIG. 18 and again to FIGS. 16-17, brush device 112' is shown after removal in the release direction "AC". The shaft portion 252 diameter is less than the diameter of partial circumferential slot 244. The diameter of partial circumferential slot 244 is greater than a clearance between opposed wall members 254, 256 defining a clearance opening 258 through which the shaft portion 252 can be slidably removed in the release direction "AC". A new, refurbished, or the same brush device 112' can be reinstalled in an opposite manner as the removal steps described above, or a groomer device 18' can be substituted for the brush device 112'.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bi-directional drive system for turf grooming and turf brushing operations, comprising:
    a first gear rotatably and laterally displaceably connected to a reel deck assembly;
    a reel shaft gear connected to a reel shaft of the reel deck assembly and axially rotated in a first axial rotation direction, the reel shaft supporting a turf implement;

second and third gears rotatably connected to the reel deck assembly; and an attachment member defining a turf component connected to the reel deck assembly, the turf component rotated by a drive in a first configuration in the first axial rotational direction by rotation of both the first gear and the reel shaft gear without rotation of the second and third gears and the reel shaft gear rotating in the first axial direction, the turf component rotated by a drive in a second configuration in a second axial rotational direction opposite to the first axial rotational direction by rotation of the first, second and third gears and the reel shaft gear and the reel shaft gear rotating in the first axial direction.

2. The bi-directional drive system for turf grooming and turf brushing operations of claim 1, the drive further including a cogged belt engaged to the reel shaft gear rotating the turf grooming component.

3. The bi-directional drive system for turf grooming and turf brushing operations of claim 2, wherein the cogged belt has a cogged inside face engaged to both the first gear and the reel shaft gear.

4. The bi-directional drive system for turf grooming and turf brushing operations of claim 2, wherein the cogged belt has a cogged inside face engaged to the first gear, the second gear and the third gear and a cogged outside face engaged to the reel shaft gear.

5. The bi-directional drive system for turf grooming and turf brushing operations of claim 2, wherein the first gear is slidably displaced toward the reel shaft gear to reduce tension on the cogged belt.

6. The bi-directional drive system for turf grooming and turf brushing operations of claim 5, further including a tensioning adjustment fastener released to allow displacement of the first gear and torqued to fix a position of the first gear.

7. The bi-directional drive system for turf grooming and turf brushing operations of claim 1, further including a drive component defining a flexible belt cogged on at least one side, the flexible belt coupling the first gear to the reel shaft gear and operating when the turf component is a turf grooming component and when the reel shaft gear is rotated to rotate the turf grooming component in the first axial rotation direction.

8. The bi-directional drive system for turf grooming and turf brushing operations of claim 1, the drive further including a drive component defining a flexible belt cogged on opposite first and second sides, the flexible belt coupled to the first gear, the reel shaft gear and to the second and third gears and operating when the turf component defines a turf brushing component and when the reel shaft gear is rotated to rotate the turf brushing component in the second axial rotational direction.

9. The bi-directional drive system for turf grooming and turf brushing operations of claim 6, wherein the second and third gears define idler gears.

10. The bi-directional drive system for turf grooming and turf brushing operations of claim 2, wherein the attachment member is one of a groomer device and a brush device, the groomer device and the brush device directly interchangeable with each other after displacement of the first gear toward the reel shaft gear to release tension on the cogged belt.

11. The bi-directional drive system for turf grooming and turf brushing operations of claim 2, wherein the attachment member includes a bearing extending from a bearing housing which is non-rotatably received in a partial circumferential slot created in an assembly plate of the reel deck housing.

12. The bi-directional drive system for turf grooming and turf brushing operations of claim 11, wherein a diameter of the bearing substantially matches a diameter of the partial circumferential slot such that the bearing is prevented from displacing in a release direction "AC" transverse to a longitudinal axis of the brush device.

13. The bi-directional drive system for turf grooming and turf brushing operations of claim 12, wherein to remove the attachment member a fastener threaded into a threaded aperture of the bearing housing is removed from an unthreaded aperture of the assembly plate, the attachment member is then displaced in an axial displacement direction "AD" until the bearing moves out of the partial circumferential slot such that a shaft portion of the attachment member having a smaller diameter than both the bearing and the partial circumferential slot is moved in the release direction "AC" through the partial circumferential slot.

14. A bi-directional drive system for turf grooming and turf brushing operations, comprising:
a first gear rotatably and laterally displaceably connected to a reel deck assembly;
a reel shaft gear connected to a reel shaft of the reel deck assembly and axially rotated in a first axial rotation direction, the reel shaft supporting a turf implement;
second and third gears rotatably connected to the reel deck assembly; and
one of a turf grooming or a turf brushing component interchangeably connected to the reel deck assembly, the turf grooming component when connected rotated by a drive in a first configuration in the first axial rotational direction by rotation of both the first gear and the reel shaft gear without rotation of the second and third gears and the reel shaft gear rotating in the first axial direction, the turf brushing component when connected rotated by a drive in a second configuration in a second axial rotational direction opposite to the first axial rotational direction by rotation of the first, second and third gears and the reel shaft gear and the reel shaft gear rotating in the first axial direction.

15. The bi-directional drive system for turf grooming and turf brushing operations of claim 14, the drive further including a flexible drive belt engaged to the reel shaft gear rotating one of the turf grooming component or the turf brushing component.

16. The bi-directional drive system for turf grooming and turf brushing operations of claim 15, wherein at least one side of the flexible drive belt is cogged.

17. The bi-directional drive system for turf grooming and turf brushing operations of claim 15, further including a tensioning adjustment fastener released to allow displacement of the first gear and torqued to fix a position of the first gear, displacement of the first gear either increasing or decreasing a tension on the flexible drive belt.

18. The bi-directional drive system for turf grooming and turf brushing operations of claim 15, wherein the flexible drive belt has a first length when engaged to the reel shaft gear and the first gear.

19. The bi-directional drive system for turf grooming and turf brushing operations of claim 18, wherein the flexible drive belt has a second length longer than the first length when engaged to the reel shaft gear and the first, second and third gears.

20. A bi-directional drive system for turf grooming and turf brushing operations, comprising:
a first gear rotatably and laterally displaceably connected to a reel deck assembly;
a reel shaft gear connected to a reel shaft of the reel deck assembly and axially rotated in a first axial rotation direction, the reel shaft supporting a turf implement;

second and third gears rotatably connected to the reel deck assembly;

one of either a first or a second flexible cogged belt engaged to the reel shaft gear, the second flexible cogged belt being longer than the first flexible cogged belt; and an attachment member defining a turf component connected to the reel deck assembly, the turf component rotated by the first flexible cogged belt in the first axial rotational direction by rotation of the reel shaft gear connected to the first gear by the first flexible cogged belt which does not contact or rotate the second and third gears and the reel shaft gear rotating in the first axial direction, the turf component rotated by the second flexible cogged belt in a second axial rotational direction opposite to the first axial rotational direction by rotation of the reel shaft gear connected to the first, second and third gears by use of the second flexible cogged belt and the reel shaft ear rotating in the first axial direction.

21. The bi-directional drive system for turf grooming and turf brushing operations of claim 20, further including a reel blade assembly supported on a reel blade shaft rotatably connected to opposed first and second drive housings, the reel shaft gear connected to and rotated by rotation of the reel blade shaft.

22. The bi-directional drive system for turf grooming and turf brushing operations of claim 21, further including:

a stub shaft having a positive engagement drive member extending therefrom and the first gear connected thereto; and the double sided cogged belt connected to the reel blade gear and the first gear such that rotation of the reel blade shaft directly rotates the stub shaft and thereby the attachment member.

23. The bi-directional drive system for turf grooming and turf brushing operations of claim 22, wherein:

the stub shaft includes a longitudinal through bore receiving a fastener, the fastener releasably coupling the stub shaft to the attachment member; and the attachment member includes a rectangular shaped cavity matching a geometry of and slidably receiving the positive engagement drive member.

24. The bi-directional drive system for turf grooming and turf brushing operations of claim 22, wherein the attachment member includes a first half-moon shaped member and the positive engagement drive member includes a second half-moon shaped member engaged with the first half-moon shaped member, the first and second half-moon shaped members being rotatable with respect to each other to create an opening allowing displacement of the attachment member in a direction substantially normal to a longitudinal axis of the attachment member.

* * * * *

UNITED STATES PATENT AND TRADEMARK OFFICE
CERTIFICATE OF CORRECTION

PATENT NO. : 8,844,252 B2
APPLICATION NO. : 14/059565
DATED : September 30, 2014
INVENTOR(S) : Robert J. Pilon, Jr. and Richard M. Krzesicki It is certified that error appears in the above-identified patent and that said Letters Patent is hereby corrected as shown below:

In the Claims

Column 17, line 18, replace "ear" with "gear".

Signed and Sealed this
Twenty-second Day of December, 2015

Michelle K. Lee
*Director of the United States Patent and Trademark Office*